July 19, 1938.  L. M. WILEY  2,124,222
BICYCLE LAMP
Filed May 16, 1936  2 Sheets-Sheet 1
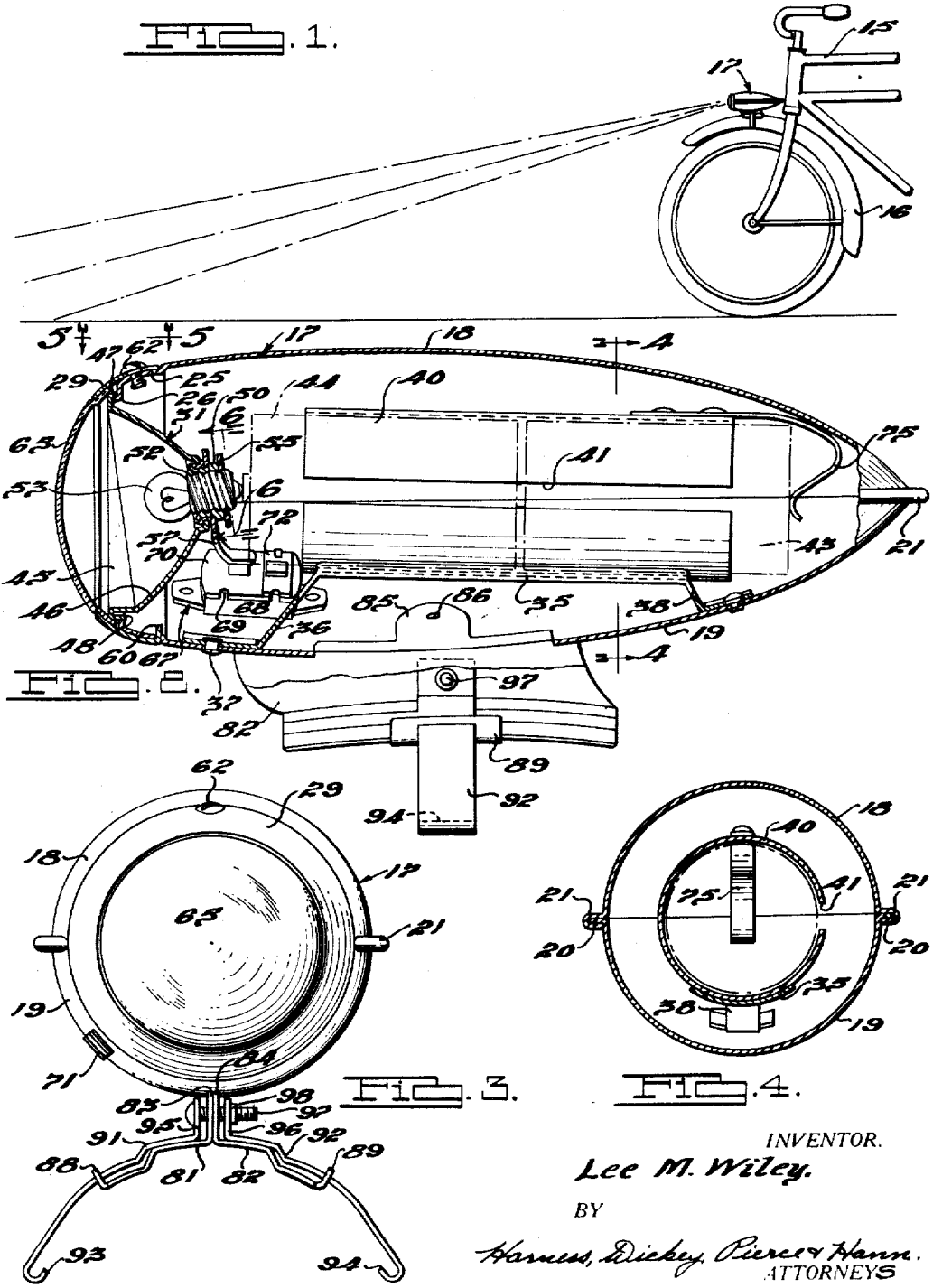
INVENTOR.
Lee M. Wiley.
BY
Harness, Dickey, Pierce & Hann.
ATTORNEYS July 19, 1938.　　　L. M. WILEY　　　2,124,222
BICYCLE LAMP
Filed May 16, 1936　　　2 Sheets-Sheet 2
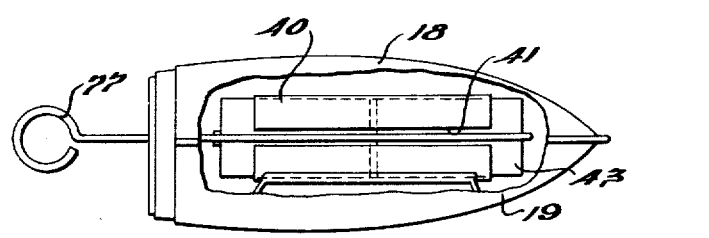
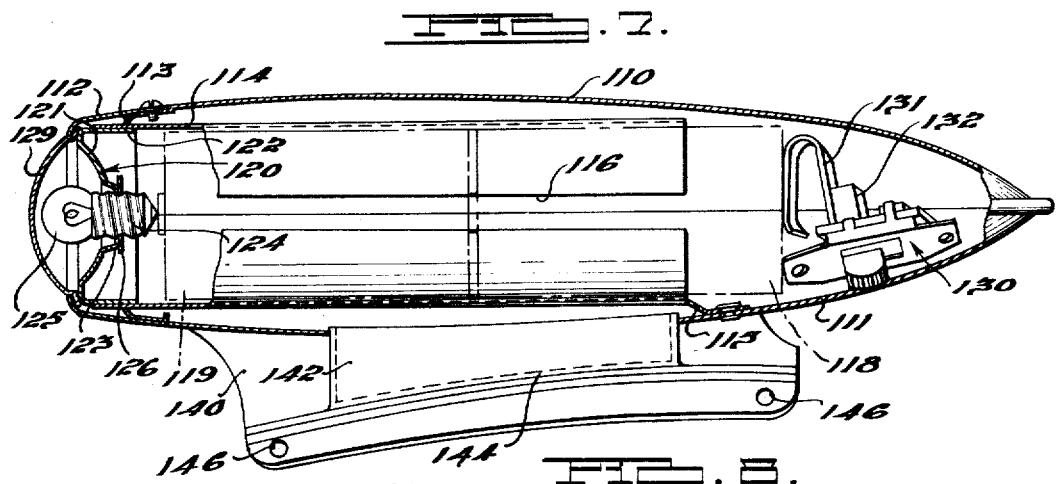
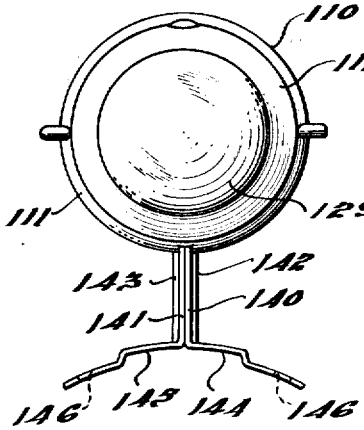
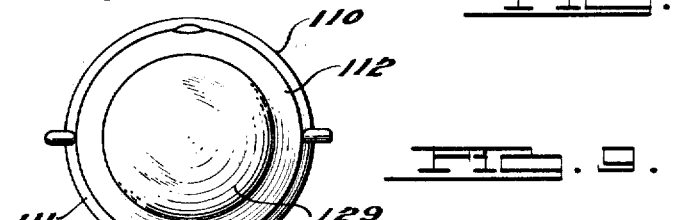
INVENTOR.
*Lee M. Wiley.*
BY
*Harness, Dickey, Pierce & Hann.*
ATTORNEYS.

Patented July 19, 1938

2,124,222

UNITED STATES PATENT OFFICE 2,124,222

BICYCLE LAMP

Lee M. Wiley, Marion, Ind., assignor to Delta Electric Company, a corporation of Indiana Application May 16, 1936, Serial No. 80,074

6 Claims. (Cl. 240—7.55)

This invention relates to electric lamp units and is particularly adaptable for use as electric lamp units to be mounted on bicycles.

Objects of the invention are to provide a lamp of the type described in which the outer shell is usually long as compared to its diameter and is streamlined, and is formed in sections fastened together by way of a clinched seam forming a fin therearound; to provide unitary lamps of such construction that the dry cells and switch means are contained as a unit therein; to provide a battery holder adapted to be mounted within the shell or casing of a lamp and of such construction that expansion of the exhausted dry cells held therein will be permitted; to provide a battery holder within a long casing which is closed at one end and open at the other which will permit convenient removal of exhausted batteries through the open end; to provide an offset reflector so constructed and arranged that the lamp may be mounted with its center line horizontal but the light beams are projected downwardly; to provide a mounting for an excessively long lamp that makes possible the ready application of the lamp to the bicycle and maintains it in place in use; to provide a mud guard clamping means which may be attached to various shapes and sizes of mud guards without having to drill or mar the mud guard in any way; and to provide compact, rugged lamp units attractive in appearance and inexpensive to manufacture.

Other objects of the invention will become apparent from the following specification, the drawings relating thereto, and from the claims hereinafter set forth.

In the drawings, in which like numerals are used throughout to designate like parts in the several views, Figure 1 is a fragmentary side elevational view of the forward part of a bicycle having mounted thereon a lamp unit embodying features of the present invention;

Fig. 2 is a side elevational view with parts broken away, and parts in section, of one embodiment of the lamp units forming the present invention;

Fig. 3 is a front elevational view of the lamp unit shown in Fig. 2;

Fig. 4 is a sectional view taken substantially along the line 4—4 of Figure 2;

Fig. 5 is a plan view substantially in the direction of the arrows 5—5 in Fig. 2, showing a prefered structure for mounting the forward retaining portion of the lamp unit on the main casing;

Fig. 6 is an elevational view of the fiber, focus lock nut preferably employed in the structures of the present invention;

Fig. 7 is a side elevational view with parts broken away of the casing unit shown in Fig. 2 with the forward portion and reflector unit removed and parts broken away, illustrating a preferred method of removing the exhausted dry cells from the holder through the open end of the casing;

Fig. 8 is a side elevational view, partly in vertical section and showing certain parts broken away, illustrating a modified lamp unit embodying features of the present invention, and Fig. 9 is a front elevational view of the modified lamp unit illustrated in Fig. 8.

In present day bicycle construction, it is necessary to put on the market a bicyle of attractive appearance and in providing the accessories, such as lamps, for example, one of the important aspects is to construct the accessories of pleasing, attractive appearance, as well as having sound structural and operating characteristics, and mount them on the bicycle in a manner which will not mar the appearance of the bicycle. In past constructions, it has been the practice to mount the lamp casing and the battery casing upon different parts of the bicycle and connect them by the necessary wiring. Such structures are objectionable as they are cumbersome in appearance and require more and expensive parts to manufacture and assemble. These objections are overcome in the present invention by providing an exceptionally long, streamlined electric bicycle lamp unit, which is compact and rugged in construction yet attractive in appearance and has contained within the casing of the unit, extending lengthwise thereof, a dry cell holder. The reflector light bulb and switch are also mounted within the casing and the entire unit provides an independent lamp structure for mounting on bicycles dispensing with the necessity of separated parts and cumbersome wiring.

It is also desirable to rigidly mount the lamp casing unit upon the bicycle and it is particularly desirable, where the lamp casing is excessively long and narrow in shape, to rigidly mount the unit on the bicycle so that the longitudinal center line of the casing is in a substantially horizontal position, since it then conforms to the design of present day bicycle construction and does not spoil, but rather enhances, the appearance thereof. This is particularly true when the lamp is mounted on the bicycle mud guard; and when so mounted, it is preferable to offset the reflector by tilting it forwardly at the top in order to allow the lamp to be mounted in the horizontal plane and cause the light beams projected from the reflector to be directed downwardly so that the bright spot of the light is concentrated relatively close to the lamp, where it is most effective for safe operation.

Various types of mountings may be provided for the lamp unit, one type being a single stud which is attached to the lamp and projects through an opening in the mud guard, having a nut on the stud under the guard to securely hold the lamp in position on the guard. Another type of mounting for mounting the lamp on a bicycle handlebar is a clamp which is secured to the lamp at one end and has resilient portions fitting over and clamped to the handlebar. A preferred form of mounting, which constitutes features of the present invention, comprises a relatively long support shaped at its upper edge to the shape of the lamp casing and shaped at its lower edge to the transverse and longitudinal shape of the mudguard to which the lamp is to be attached, and preferably provided with adjustable clamping means which engage the edges of the mudguard and rigidly hold the lamp thereon without the necessity of marring the mudguard.

For a better understanding of the invention, reference may be had to the accompanying drawings, and in Fig. 1 a portion of a bicycle 15 of conventional construction is shown, having a front mud guard 16 with an electric lamp unit 17 embodying features of the present invention mounted therein.

An embodiment of the electric lamp unit 17 is shown in greater detail in Figs. 2 to 7 and comprises a main body casing or shell which is made up of an upper section 18 and a lower section 19, each section being substantially semicircular in shape in transverse section and being joined along their horizontally disposed edges so that transverse sections of the assembled sections forming the main body portion or shell are substantially circular in form. The sections are extremely long and are curved longitudinally so that the greatest diameter is slightly forward of the center of the lamp and gradually tapers toward the rear to substantially a point to give the streamlined effect and to close the rear end, and tapers slightly forwardly for a short distance, terminating in an opening at the front end. The lower section has an outwardly and horizontally formed flange 20 extending therearound and the upper section has an outwardly extending flange 21 of greater length than the flange 20, the flange 21 being rolled over and clamped to the flange 20 as best shown in Fig. 4 to form a horizontal fin or bead around the head portion of the lamp unit and rigidly securing the two sections together. The front edge portions of sections 18 and 19 are stepped inwardly around the periphery thereof at 25 and 26, to provide a seat for the front, or retaining ring portion 29 and to provide a mounting for a metal reflector unit 31, respectively, when the sections are assembled.

When dry cells become exhausted they very often expand, and if they initially fit their holders with any degree of tightness, upon expansion they will, of course, become more tightly held within the holder, often freezing therein, and making it exceptionally difficult to remove them when it is desired to insert new batteries. Since it is desirable that the dry cells be securely held in position at all times, the present invention provides a resilient holder which will securely hold the cells when initially placed therein but will permit their expansion upon exhaustion and yet permit ready removal of the exhausted cells. This is particularly important in structures such as the present ones where the battery is mounted within a casing of the lamp unit which is long and open at one end only.

In order to provide a holder for the dry cells, a mounting means is provided within the casing and comprises an elongated cradle shaped member 35, which has a forwardly and downwardly extending portion 36, bent to conform to the shape of the inner surface of the sections 19 and secured thereto by means of a rivet 37 or the like. Extending from the rear edge of the member 35 is a portion 38 which is bent downwardly and rearwardly and conforms in shape to the inner surface of the sections 19, and is secured thereto by means of a rivet or the like.

A holder for dry cells which comprises a substantially cylindrical resilient sheet metal member 40 is slotted along one side throughout its length, as indicated at 41, and is rigidly secured to the member 35 by suitable securing means. In the illustration shown, the holder is of such a length that it is adapted to hold therein two dry cells 43 and 44 in series, but it is to be understood that the holder may be of such a size and length that any desired number of dry cells may be mounted therein. By constructing the holder of resilient or readily yieldable material and providing the slot 41 it can be seen that the holder may extend the width of the slot to permit expansion of the cells therein without unduly binding the cells within the holder.

The reflector unit 31, which is mounted over the forward opening formed by the sections 18 and 19, is preferably so constructed that it may be mounted in an offset relationship to the horizontal center line of the casing unit, so that the light beams reflected therefrom will be directed downwardly to form a bright spot in front of the vehicle close to the lamp when the lamp is mounted on the vehicle with its center line in a substantially horizontal plane. This is accomplished by constructing an extension 45 on the front of the main parabolic section 46 of the reflector, the extension extending around the front periphery of the parabolic section, having its greatest width at the bottom and gradually diminishing in width to a point at the top. The extension 45 is formed integral with the parabolic section 46 to form the main part of the reflector unit, and the outer edge of the reflector unit is bent back upon itself around the outer periphery thereof, as indicated at 47, and seats upon the forwardly extending step 26 of the casing unit formed in assembling the sections 18 and 19. The stepped-in portion 26 is slotted at the bottom to receive a tongued portion on the reversely bent portion 47, as indicated at 48, to assist in properly positioning and holding the reflector unit on the seat provided by the portion 26.

The parabolic section 46 is suitably secured at its rear edge to a metal base 50, for example, by soldering, and the base is internally threaded to receive the base portion 52 of a light bulb 53. A fiber lock nut 55 is preferably screwed over the rear end of the lamp bulb base to lock the bulb in its properly focused position within the reflector and prevent displacement thereof during use. A spring contact member 57 is suitably secured to the base member 50 by an annular portion, which extends around the base member 50 and may be placed in contact at its other end with one of the poles of a switch, as will be later described in more detail.

The annular front section, or retainer ring, 29 is secured to the open end of the assembled sections 18 and 19 by providing at the rear edge of the bottom of the section 29 an upturned tongue 60 which fits into a cooperating slot at the bottom and rear of the inwardly stepped portion 25 and is provided at the rear edge of its top with an open slot 61 which cooperates with an opening in the top of the inturned portion 25 through which a screw 62 is threaded. Screw 62 is preferably upset at its inner end so that it cannot be entirely removed; and to remove the front section 29, it is merely necessary to loosen the screw 62 and remove the front section 29 from engagement with the portion 25 by sliding it forwardly along the slot 61 until it is free at the top and then lowering the section to remove the tongue 60 from its cooperating slot. A lens 65, preferably of the unbreakable type, has an inwardly offset edge portion around its outer periphery which is tightly held between the forward edge of the section 29 and the edge 47 of the reflector when the parts are assembled.

A switch 67 is provided, preferably in the ground circuit, and comprises a metallic base portion 68 with upstanding sides, the sides being provided at their upper edges with lugs 69 which clamp over an insulating member 70 and hold it in position on the upper edges of the base member 68. The base member 68 is suitably secured by means of rivets or the like to the inside surface of the front of the lower section 19. An elongated slot is provided in the section 19 and has projecting therethrough the shiftable switch button 71. The insulating member 70 is provided with two openings therethrough, through which two contact poles of the switch project, one of said poles being in contact with the spring element 57 when the parts are assembled, and the other being in contact with a metallic plate 72, which is secured in place on top of the insulating member 70 by means of the projections on the metal base member 68 and is, therefore, in contact with the base member through the projections. The switch is operated in a manner well understood to make or break the circuit therethrough.

The battery holder 40 has suitably secured thereto at its rear and top a spring contact means 75 which is bent so that it is spaced from the wall of the section 18 and is in electrical contact with the cell 43. The two cells shown, 43 and 44, are in series, the cell 44 being in contact with a terminal at the central portion of the rear of the bulb 53.

When the switch is in the position closing the circuit, the circuit is traced from the battery through one terminal of the light filament, the other terminal being connected to the lamp base 52, through the base member 50, the spring contact means 57, through the closed switch to the metallic plate member 72, which is grounded to the light casing through the base 68. The spring element 75 grounds the cell 43 to the casing sections 19 through the holder 40, and the support 35, completing the circuit.

In order to remove exhausted dry cells from the holder 40, the front section 29 may be removed, as has been explained, and then the reflector unit 31 lifted out from its seat on the stepped portion 26, exposing the opening in the front of the assembled sections 18 and 19. As shown in Fig. 7, the dry cells may then be removed through the open end by inserting a tool 77, having an inwardly bent portion at the inserted end, into and along the length of the casing and hooking the inwardly bent portion over the rear of the dry cell 43. The dry cells may then be pulled through the open end by the tool 77, since the slot 41 makes possible free travel of the inwardly bent end along the length of the holder. By the construction of the holder 40 with the slot 41 throughout its length, it can thus be seen that a structure is provided by which the cells are always securely held in place, and may easily and quickly be removed when they become exhausted.

The mounting means for the lamp shown in Figs. 2 and 3 comprises two oppositely disposed support members 81 and 82 with upstanding facing portions 83 and 84, which for a portion of their length are given a shape complementary to that of the under side of the section 19 and in the central portions thereof are provided with projections, one of which is shown at 85, which pass through an elongated slot in the bottom of the section 19, and on the inside are bent in opposite directions against the inside surface of the section 19 and secured thereto by suitable securing means, as rivets for example, one of such securing means being indicated at 86. The two supporting members 81 and 82 are bent outwardly in opposite directions to each other adjacent the bottoms of the portions 83 and 84 and are given a shape both transversely and longitudinally substantially similar to that of the top of the mud guard to which the lamp is to be attached. The outer edges of the members 81 and 82 are provided with projections 88 and 89, respectively, which are bent upwardly and are provided with elongated slots through which resilient sheet metal members 91 and 92 project in slidable engagement therewith. The resilient members 91 and 92 are adapted to saddle the mud guard and are provided on their lower extremities with turned in edges 93 and 94, which envelop the edges of the mud guard when the lamp is mounted thereon. The opposite ends of the members 91 and 92 are bent upwardly, as indicated at 95 and 96, and are provided with aligned openings therethrough which are also aligned with openings through the portions 83 and 84, through which an adjusting means in the form of a bolt 97 passes and has screwed on to the end thereof a nut 98. The two members 91 and 92 are guided by the slots in the projections 88 and 89 and are adapted to slide over the upper surfaces of the members 81 and 82. By tightening the nut 98, the members 91 and 92 are drawn toward each other, thereby adjusting their relative positions and causing the hooked-back portions 93 and 94 to securely engage the opposite edges of the mud guard. It can be seen from the present construction that there is provided a relatively simple yet rugged mounting for maintaining the lamp in its position on the mud guard during hard usage, and that in using the mounting just described, it is not necessary to drill holes or otherwise mar the mud guard upon which it is desired to mount the lamp.

In Figs. 8 and 9, a modified form of lamp unit is shown, the main casing portion comprising an upper section 110 and a lower section 111 joined together in the same manner as described in regard to the embodiment shown in Figs. 2 to 4, but in the present modification the sections 110 and 111 are relatively longer and flatter than the sections of the previously described embodiment, so that a relatively longer and flatter casing is provided. The forward edges of the sections 110 and 111 are offset inwardly to provide a seat around the periphery of the assembled sections for the enclosing front portion, or retaining ring, 112 which is attached to the assembled sections 110 and 111 in the same manner as in the previously described embodiment.

The forward edges of the sections 110 and 111 are bent inwardly as indicated at 113 around the periphery thereof and provide a front support for a dry cell holder 114, which is preferably cylindrical in shape, when the sections are assembled. The holder 114 is provided at its bottom rear edge with a rearwardly and downwardly extending projection 115, which is directly connected by means of rivets or the like to the section 111. The holder 114 is also preferably slotted throughout its length as indicated at 116 for the same purposes as described in the embodiment shown in Figs. 2 to 7. In the present modification, the holder 114 is shown by way of illustration as containing two dry cells 118 and 119 in series.

A metallic reflector unit 120 has a main parabolic portion 121 and is bent upwardly and then rearwardly in a substantially horizontal plane around the periphery thereof, as indicated at 122, the portion 122 having an outside diameter substantially the same as the inside diameter of the holder 114 and adapted to be mounted within the holder 114 at its forward edge. The reflector unit 120 is bent inwardly at 123 at substantially its rear and center to form an opening therethrough, adapted to receive a threaded base portion 124 of a light bulb 125 to position the light bulb in the lamp unit. It is preferable to provide a fiber lock nut 126 over the base portion 124 to prevent displacement of the bulb 125 from its proper focused position in respect to the reflector.

A lens 129, preferably of the unbreakable type, has an inwardly offset portion around the periphery of its outer edge which is tightly held between the inturned front edge of the portion 112 and the upturned peripheral edge of the reflector unit when the parts are assembled.

In the present modification, a switch unit 130 is provided in the ground circuit and is suitably secured to the section 111 toward its rear in a manner similar to that described in the previous embodiment. In the present modification, the switch is located between the batteries and the shell in the ground circuit and is similar in most details to the switch 67, except that in the present modification, a U-shaped spring 131 is rigidly secured at one end to one of the switch terminals 132 in electrical contact therewith and is in resilient engagement at the other end of the spring 131 with one of the terminals of the battery 118. The spring 131 tends to force the batteries and the reflector units forwardly and will take up any looseness in the reflector unit mounting by forcing the unit into engagement with the inner surface of the lens and maintains contact between the circuit elements.

The circuit may be traced from the batteries through one end of the lamp filament and out of the other end of the filament to the lamp base, through the metallic reflector units to the casing. The circuit is completed through the switch, which is also grounded to the casing, and through the spring contact 131 to one terminal of the battery.

A mounting means for the relatively long casing unit of the present modification is provided in the form of two relatively long plate members 140 and 141, which have upstanding portions facing each other and are shaped along the upper edges thereof complementary to the shape of the under surface of the sections 111 which they engage. The upstanding portions are pressed outwardly at distances from the front edges thereof to slightly separate the plates and provide a stiffer support for the casing, the outwardly pressed portions being indicated at 142 and 143 and gradually tapering toward each other until the plates contact each other toward the rear. Projections, as in the embodiment of Figs. 1 to 4, are provided in the central portions of the plate members, which pass through an elongated opening in the under side of the section 111 and are rigidly secured to the inner surface of the section 111 on opposite sides of the opening. The bottom portions of the members 140 and 141 are bent outwardly in opposite directions to each other and given the transverse shape of the mud guard upon which the lamp is to be mounted, as indicated at 144 and 145. The portions 144 and 145 are also curved longitudinally to substantially the curvature of the mud guard, so that a firm and attractive mounting is presented. Apertures 146 are provided at the desired locations on the portions 144 and 145 and are adapted to cooperate with aligned openings in the mud guard through which suitable securing means, such as bolts or the like, may be passed to fix the lamp in position on the mud guard.

Formal changes may be made in the specific embodiments of the invention described without departing from the spirit and substance of the invention, the scope of which is commensurate with the appended claims.

What is claimed is:

1. An electric bicycle lamp unit comprising an elongated casing open at one end and a dry cell holder contained within said casing and supported in spaced relation to the walls of said casing for free expansion therein, means permanently fixing said holder in said casing, said holder being slotted to permit expansion and ready removal through one end of the holder of exhausted dry cells held therein without removal of said holder from said casing.

2. In combination with a mud guard, a casing, a casing mounting having a yoke shaped bracket comprising resilient sheet metal members saddled on said mud guard, means on the lower extremities of said members enveloping the edges of said mud guard, a support means attached to said casing, said support means extending between said members and transversely over said mud guard and having upstanding portions at its lower extremities provided with openings therethrough through which said members extend in slidable contact therewith, and adjustable means connecting said members so constructed and arranged that said members are drawn into engagement with said mud guard.

3. An electric bicycle lamp unit comprising an elongated casing open at one end, and an elongated substantially cylindrical dry cell holder mounted within said casing longitudinally thereof and supported in spaced relation to the walls of said casing for free expansion therein, said holder being resilient and being slotted to permit expansion and ready removal of exhausted dry cells held therein.

4. An electric bicycle lamp unit comprising an elongated casing open at one end, and an elongated substantially cylindrical dry cell holder open at its ends mounted longitudinally within said casing and supported in spaced relation to the walls of said casing for free expansion therein, said holder being resilient and being slotted throughout its length to permit expansion and ready removal of exhausted dry cells held therein.

5. An electric bicycle lamp unit comprising an elongated casing, said casing comprising an elongated outer shell having an open end and constructed of a plurality of sections fastened together along a substantially horizontal plane by a clinched seam externally thereof forming a substantially horizontal fin therearound, means for removably enclosing said open end, and an elongated substantially cylindrical dry cell holder fixedly mounted longtudinally within said casing and supported thereby in spaced relation to the walls of said casing, said holder being slotted throughout its length in order that the dry cells held therein are permitted to expand upon exhaustion.

6. An electric bicycle lamp unit comprising an elongated casing, said casing comprising an elongated outer shell having an open end and constructed of a plurality of sections fastened together along a substantially horizontal plane having a clinched seam externally thereof forming a substantially horizontal fin therearound, means for removably enclosing said open end, and an elongated substantially cylindrical dry cell holder open at its ends fixedly mounted within said casing longitudinally thereof and supported by said casing in longitudinally spaced relation thereto, said holder being slotted throughout its length in order to permit expansion and ready removal through said open end of the dry cells held therein.

LEE M. WILEY.

CERTIFICATE OF CORRECTION.

Patent No. 2,124,222.     July 19, 1938.

LEE M. WILEY.

It is hereby certified that error appears in the printed specification of the above numbered patent requiring correction as follows: Page 1, first column, line 6, for the word "usually" read unusually; and that the said Letters Patent should be read with this correction therein that the same may conform to the record of the case in the Patent Office.

Signed and sealed this 30th day of August, A. D. 1938.

Henry Van Arsdale (Seal)                                Acting Commissioner of Patents.

open at its ends mounted longitudinally within said casing and supported in spaced relation to the walls of said casing for free expansion therein, said holder being resilient and being slotted throughout its length to permit expansion and ready removal of exhausted dry cells held therein.

5. An electric bicycle lamp unit comprising an elongated casing, said casing comprising an elongated outer shell having an open end and constructed of a plurality of sections fastened together along a substantially horizontal plane by a clinched seam externally thereof forming a substantially horizontal fin therearound, means for removably enclosing said open end, and an elongated substantially cylindrical dry cell holder fixedly mounted longtudinally within said casing and supported thereby in spaced relation to the walls of said casing, said holder being slotted throughout its length in order that the dry cells held therein are permitted to expand upon exhaustion.

6. An electric bicycle lamp unit comprising an elongated casing, said casing comprising an elongated outer shell having an open end and constructed of a plurality of sections fastened together along a substantially horizontal plane having a clinched seam externally thereof forming a substantially horizontal fin therearound, means for removably enclosing said open end, and an elongated substantially cylindrical dry cell holder open at its ends fixedly mounted within said casing longitudinally thereof and supported by said casing in longitudinally spaced relation thereto, said holder being slotted throughout its length in order to permit expansion and ready removal through said open end of the dry cells held therein.

LEE M. WILEY.

CERTIFICATE OF CORRECTION.

Patent No. 2,124,222.                        July 19, 1938.

LEE M. WILEY.

It is hereby certified that error appears in the printed specification of the above numbered patent requiring correction as follows: Page 1, first column, line 6, for the word "usually" read unusually; and that the said Letters Patent should be read with this correction therein that the same may conform to the record of the case in the Patent Office.

Signed and sealed this 30th day of August, A. D. 1938.

Henry Van Arsdale (Seal)                                      Acting Commissioner of Patents.